United States Patent [19]

Lapeyre

[11] Patent Number: 4,490,232

[45] Date of Patent: Dec. 25, 1984

[54] WAVE-POWERED ELECTROLYSIS OF WATER

[75] Inventor: James M. Lapeyre, New Orleans, La.

[73] Assignee: The Laitram Corporation, New Orleans, La.

[21] Appl. No.: 591,222

[22] Filed: Feb. 1, 1984

Related U.S. Application Data

[63] Continuation of Ser. No. 316,502, Oct. 29, 1981, abandoned.

[51] Int. Cl.³ ............... C25B 15/00; C25B 1/02
[52] U.S. Cl. .................... 204/278; 204/275; 204/129; 203/10; 203/22; 203/25; 203/DIG. 8; 203/DIG. 16; 203/DIG. 24; 290/42; 290/43; 290/53; 290/54
[58] Field of Search ............ 204/129, 255–258, 204/262–263, 266, 269, 275, 278; 203/10, 22, 25, DIG. 8, DIG. 16, DIG. 24; 290/42, 43, 53, 54

[56] References Cited

U.S. PATENT DOCUMENTS

| 868,798 | 10/1907 | McLaughlin | 290/54 |
|---|---|---|---|
| 2,790,186 | 4/1957 | Carapellotti | 441/21 |
| 3,397,116 | 8/1968 | Bourland | 203/25 |
| 3,546,473 | 12/1970 | Rich | 290/53 |
| 3,652,431 | 3/1972 | Reynolds | 204/129 |
| 3,692,634 | 9/1972 | Othmer | 203/25 |
| 3,754,147 | 8/1973 | Hancock et al. | 290/53 |
| 3,828,380 | 8/1974 | Lebovits et al. | 441/21 |
| 3,980,527 | 9/1976 | Lapeyre | 203/25 |
| 4,151,046 | 4/1979 | Eidelberg | 203/25 |
| 4,209,369 | 6/1980 | Seko et al. | 204/98 |
| 4,355,923 | 10/1982 | Schwarzenbach | 405/53 |

FOREIGN PATENT DOCUMENTS

| 18470 | 12/1976 | Australia | 290/53 |
|---|---|---|---|
| 2550652 | 1/1977 | Fed. Rep. of Germany | 290/53 |
| 2298613 | 10/1974 | France | 204/129 |
| 1513162 | 6/1978 | United Kingdom | 204/129 |

Primary Examiner—R. L. Andrews
Attorney, Agent, or Firm—Weingarten, Schurgin, Gagnebin & Hayes

[57] ABSTRACT

An offshore water electrolysis plant which produces pressurized gas by electrolysis of fresh water and wave power includes the combination of a wave-powered electric generator at the ocean surface, an electrolyzer and storage vessels located on the ocean bottom for providing gas under pressure, and a source of fresh water at the ocean surface forced down to the submerged electrolyzer through the use of a water-filled standpipe. In one embodiment, the electric power generating system includes a tethered floating helix coupled to an electric generator, in which the helix is automatically aligned with the wave propagation direction, while in another embodiment linear alternators are mounted for reciprocation on a column which extends through the air-sea interface, with each alternator provided with a donut-shaped float, such that electric power is generated as each float moves vertically up and down responsive to wave motion.

7 Claims, 5 Drawing Figures

WAVE-POWERED ELECTROLYSIS OF WATER

This application is a continuation, of application Ser. No. 316,502, filed Oct. 29, 1981, now abandoned.

FIELD OF INVENTION

This invention relates to wave-powered systems for the electrolysis of water, and more particularly to a method and apparatus for providing high pressure gas by electrolysis and wave power.

BACKGROUND OF THE INVENTION

As is common, wave power has been utilized for the generation of electrical power for many purposes, including the production of hydrogen and oxygen by electrolysis of sea water. However in the electrolysis of sea water, chlorine is produced which is difficult to handle. For this reason, fresh water or even distilled water is preferred in the generation of pure oxygen and hydrogen.

Systems which use distilled or fresh water require the addition of electrolytes and systems using both solid and liquid electrolytes are common. One system for water electrolysis which utilizes a solid electrolyte is described in an article in the International Journal of Hydrogen Energy, vol. 2, pps. 395–403, Pergamon Press 1977, entitled Conceptual Design of Large Scale Water Electrolysis Plant Using Solid Polymer Electrolyte Technology by L. J. Nuttall.

When shore-based electrolyzers derive power from wave-powered generators, it is important to locate the wave-powered generators close to shore because of the cost of the electrical cable necessary to connect the onshore facility with the generating apparatus, and also because of the rather large losses in the transmission of power over long distances. This presents the problem of sufficient wave activity adjacent the processing plant. As will be appreciated, the terrain adjacent a proposed plant may not provide sufficient wave activity.

Since it is desirable to locate wave-powered generators offshore where sufficient wave activity exists, in order to minimize the distance electrical power is transmitted, it is desirable to have the water electrolysis plant located at the wave power generating site. This requires that the products of the electrolysis, e.g. hydrogen and oxygen, be piped to shore. The losses associated with piping gases over long distances are considerably less than those associated with transmitting electricity. For instance, with respect to oxygen and hydrogen, very little pumping power is required to move the gasses through a pipeline. By way of analogy, in the transportation of natural gas, pressures of 700 psi are sufficient to move the gas over several hundreds of miles without the necessity of providing auxiliary pumping stations. Thus, it is more efficient to provide pipelines for the gaseous products of offshore electrolysis rather than suffering the losses in transmitting electricity over several hundreds of miles to a shore-based facility.

This in turn raises the problem of providing fresh water offshore. As mentioned before, electrolysis of fresh or distilled water results in uncontaminated or pure hydrogen and oxygen. The energy used in pumping fresh water offshore has in the past limited efficient offshore water electrolysis. Aside from the energy expended in the pumping of fresh water to a remote ocean site, there is the problem of expending of energy in any pressurizing or pumping operation associated with water electrolysis. When relying on wave power, the problem of the use of any additional energy for pumping or pressurization becomes actute. Prior art water electrolysis systems require significant amounts of pumping and are thus not well suited for wave-powered offshore operation.

Finally, the manner in which the energy in ocean waves is converted into electrical energy is important. The Lapeyre helix, described below, provides one efficient method of energy conversion. There are however, inefficient wave energy conversion systems involving complicated mechanical structures which are subject to breakdown and are in general not to be left unattended for long periods of time.

By way of further background, a relatively modern system for generating hydrogen by water electrolysis is discussed in the Solar Energy Handbook, edited by Jan F. Kreider and Frank Kreith, published by McGraw-Hill Book Company of New York in 1981, chapter 6, entitled Energy Storage for Solar Applications by Charles J. Swet. This system describes the utilization of deionizers for the feed water to an electrolyzer, a heat exchanger for the $O_2/H_2O$ output, and separators for the resulting $O_2/H_2O$ and $H_2/H_2O$ mixtures.

Another system for producing hydrogen and oxygen by water electrolysis is illustrated by U.S. Pat. No. 3,484,617, in which a wind-driven generator drives a land-based electrolyzer for producing hydrogen and oxygen. In the system described in this patent, pumping energy is necessary in order for the system to operate properly, and offshore capability is not envisioned for this system.

A still further system for conversion of water and development of power is described in U.S. Pat. No. 3,754,147, in which the Bernoulli principle is utilized for the ingestion of air at the air-water interface. In this patent, air is forced into a dome located at the ocean floor. It is the purpose of this dome to pressurize the ingested air, which is then utilized to drive an onshore pneumatic turbine that in turn drives an electric generator. The electric generator is a land-based generator which is utilized to drive a subsurface electrolyzer for the production of oxygen and hydrogen. In this patent, wave motion is utilized to force entrained air to the ocean bottom where it is captured in a dome having its lower periphery exposed at the ocean bed. Note that air pressure drives a land-based electrical generator which supplies an electrolyzer, rather than a wave-driven electric generator directly providing power for the electrolyzer. The interposition of an additional conversion system, i.e. conversion of wave motion to compressed air and then to electrical energy, is inefficient and requires the utilization of an additional pressure dome for the capturing and compression of air.

Finally, attention is drawn to U.S. patent application Ser. No. 147,578, filed by James M. Lapeyre on May 8, 1980 and assigned to the assignee of the present invention. In this application a system is described for manufacturing hydrogen gas which utilizes the energy of surface waves that first converts the energy of surface waves to mechanical energy by apparatus which includes a buoyant helical member mounted for rotation about a horizontal axis, with the pitch of the helical member matched to the length of the expected waves. The helix drives an electrical generator which forms a d.c. current employed to electrolyze ocean water to produce hydrogen gas, which may be compressed or liquified for storage and/or transportation.

SUMMARY OF THE INVENTION

In the subject system, a wave-powered generator provides electricity to a subsurface electrolyzer coupled to subsurface gas collection storage vessels which provide pressurized gas. Fresh water is provided to the electrolyzer through the use of a water-filled standpipe. All power for the water electrolysis plant is provided by wave power. Because of the bottom mounted electrolyzer and gas collection vessels utilized, the necessity of pumping is eliminated or the amount of pumping is minimized. This permits almost all of the electrical energy generated due to wave motion to be utilized in the electrolyzer. Since fresh water is supplied to the ocean bottom electrolyzer through a standpipe, the need for pumping is eliminated. The elimination of pumping increases greatly the efficiency of the plant, making the utilization of the wave-powered electric generator feasible.

More specifically, in order to provide for the efficient utilization of wave energy, an ocean-moored processing plant includes a wave-actuated electric generator positioned at the air-sea interface below a moored platform which is supported on upstanding columns. In one embodiment the columns are flexibly anchored at their lower ends to the ocean bottom and are buoyed by submerged positively buoyant floats secured to the columns, the floats being maintained beneath the sea surface by the anchoring cables. The submerged floats act in combination with the anchoring of the lower ends of the columns to establish the vertical upright orientation of the columns.

An electrolyzer is located at the ocean bottom and includes low cost pressure vessels opened at the bottom so as to admit sea water for pressurizing the gaseous products of the electrolytic process so that they may be piped to an onshore facility without pumping. For a depth of one mile, the gaseous products are pressurized at 2000 psi which permits gas transmission over several hundreds of miles without booster pumps. The pressure vessels need not be of heavy construction since ocean pressure and gas pressure balance across the walls of the vessel and since the vessels are initially flooded, again providing balancing pressures at the walls of the vessels.

Further with respect to the provision of fresh water, fresh of distilled water is provided to the subsurface electrolyzer without pumping through the use of a water-filled standpipe from a source of fresh water located sufficiently above sea level to provide sufficient pressure for moving the lighter fresh water to the submerged electrolyzer. The source of fresh water may be obtained from an onshore reservoir located above sea level, with fresh water piped to the subsurface electrolyzer without the need of pumping due to the head established by virtue of the height of the reservoir above sea level. Makeup water may be obtained from rain collected at the moored platform in a reservoir maintained sufficiently above sea level.

In another embodiment, waste heat from the electrolysis is utilized to distill sea water at the platform, with the distilled water being forced to the ocean bottom electrolyzer through the utilization of the water-filled standpipe. Alternatively, waste heat from the electrolysis may be used to distill water in a boiler at the ocean bottom, with venting of the boiler reducing the amount of energy necessary to boil water at great ocean depths.

Two alternative wave-powered electric generators may be utilized to supply power to the subsea electrolyzer, with the first wave-powered electric generator being provided in the form of a tethered Lapeyre helix which is aligned with the wave propagation direction due to a one point tethering system. In this embodiment, the tether is anchored at one end to a slip ring which surrounds the upstanding column, such that the helix may assume a position opposing the propagation direction of the waves. The slip ring also allows vertical movement up and down to accomodate tidal changes. The electric generating apparatus is located at the distal end of the helix and is weighted such that a restoring force is supplied which counteracts the force produced by the rotation of the helix.

In an alternative embodiment, a linear alternator is provided with field windings mounted to an upstanding column. The armature for the linear alternator is formed by magnets which coaxially surround the windings. The armature is in turn mounted in the center of a bobbing float which translates on the upstanding column at the air-sea interface due to wave action such that electric power is generated as a float moves vertically up and down. A rectifying circuit is provided for the output of the linear alternator to provide the requisite d.c. current for the electrolyzing process.

BRIEF DESCRIPTION OF THE DRAWINGS

These and other features of the present invention will be better understood in connection with the following description taken in conjunction with the drawings of which.

DETAILED DESCRIPTION

Figure 1:
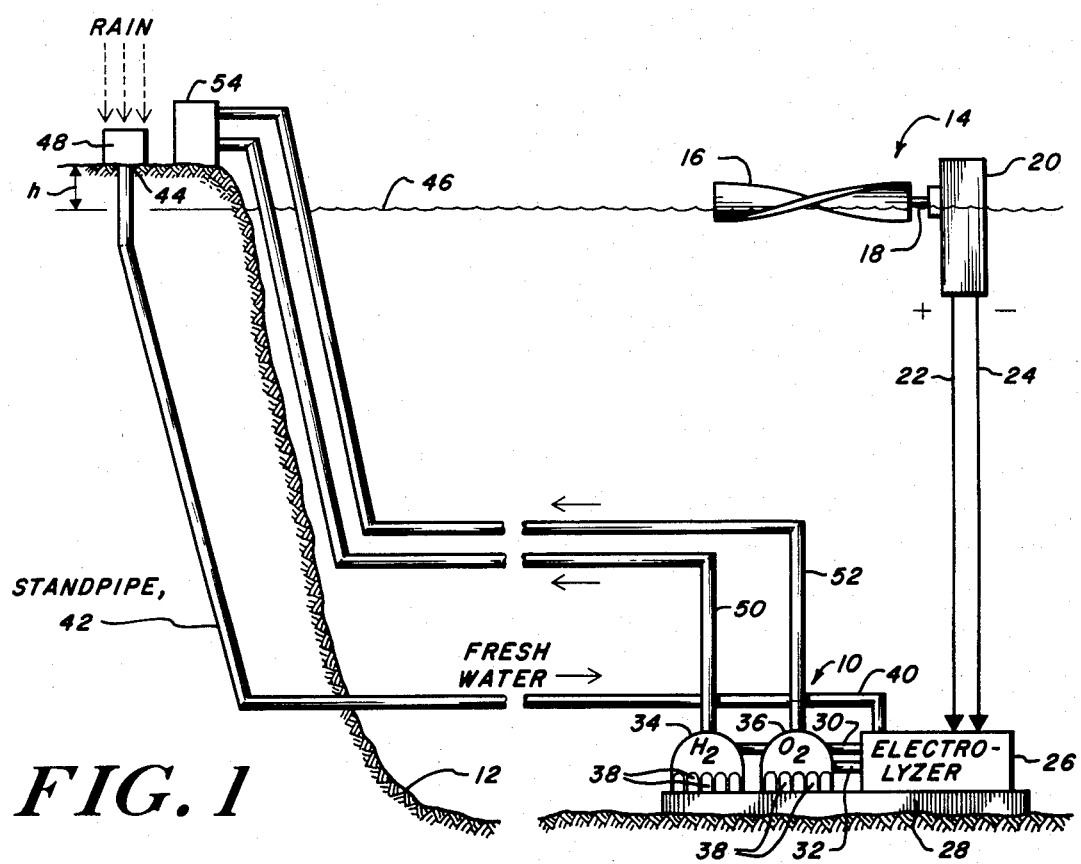
FIG. 1 is a diagrammatic representation of a wave-powered water electrolysis system with a submerged electrolysis unit, pressurized storage, and the provision of fresh feed water by means of a standpipe.

In order to provide for the efficient utilization of wave power in fresh water electrolysis and referring now to FIG. 1, a subsurface water electrolysis unit 10 is positioned on the ocean bed 12 and is provided with electrical power by a wave-powered electric generator generally indicated at 14 to include a Lapeyre floating helix 16 mechanically coupled at 18 to an electric generator 20 ballasted in the illustrated upright position such that its righting moment opposes the torque produced by the rotating helix as it rotates in accordance with wave motion. The output of generator 20 is coupled via lines 22 and 24 to an electrolyzer 26 mounted on a platform 28 at the ocean bottom. The output of electrolyzer 26 is delivered by conduits 30 and 32 to storage vessels 34 and 36 such that hydrogen is stored in vessel 34, whereas oxygen is stored in vessel 36.

These vessels are likewise mounted on platform 28 and are open at apertures 38 to admit sea-water. Originally vessels 34 and 36 are flooded with sea-water, with hydrogen and oxygen replacing the sea-water during the electrolysis of fresh water delivered by conduit 40 to electrolyzer 26.

In a preferred embodiment, the fresh water, which is lighter than sea-water, is delivered under pressure through the utilization of a water-filled standpipe 42 which runs from a position 44 a distance, h, above sea surface 46 to the electrolyzer, such that the pressure head given to the fresh water in the standpipe is determined by the height of a reservoir 48 of fresh water above the sea surface. This reservoir may be filled by rain as illustrated, may be spring fed or may be fed with any supply of fresh water. It will be appreciated that in the system illustrated in FIG. 1 no pumping is utilized to provide a fresh supply of water under pressure to a subsurface electrolyzer.

When the water electrolysis unit is located at the ocean bottom for instance a mile beneath the ocean surface, pressures exceeding 2000 psi exist at the electrolyzer unit. It will be appreciated that initially the flooded vessels 34 and 36 contain water at the pressure determined by the depth of these vessels and that in displacing this water during electrolysis, the gas produced is also maintained at this pressure. It will also be appreciated that at least initially the water pressure external to the vessels matches that internal to the vessels, such that the heavy pressure vessels need not be provided. Rather the vessels may be relatively thin-walled and thus economical in design. Vessels 34 and 36 are coupled respectively via lines 50 and 52 to a shore-based facility 54 at which the hydrogen may be used as a fuel. The oxygen may be either utilized with the hydrogen in a fuel cell or may be stored as desired.

It will be appreciated that either hydrogen or oxygen under pressure can be transported over several hundreds of miles without auxiliary pumping apparatus. As such, what is illustrated in FIG. 1 is a wave-powered hydrogen production system which can be made completely pumpless such that the entire output of the wave power generator is utilized for the electrolyzing of fresh water.

Figure 2:
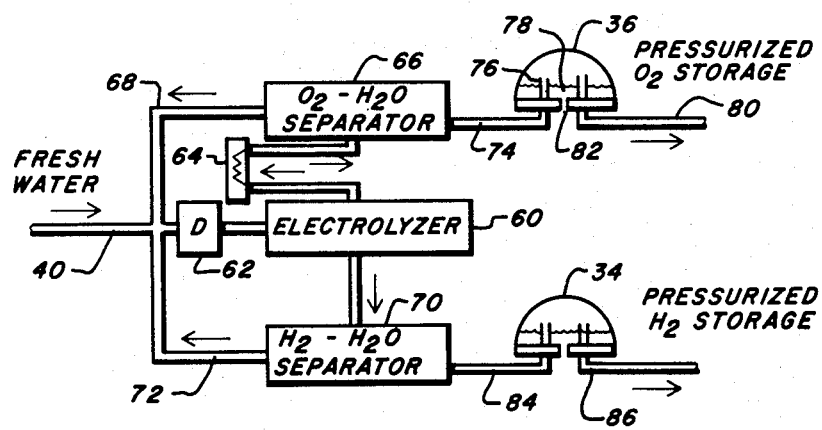
FIG. 2 is a schematic diagram of one type electrolyzing system for use in FIG. 1.

Referring to FIG. 2, one type electrolyzer suitable for use as electrolyzer 26 includes a conventional fresh water electrolyzer 60 fed with fresh water via pipe 40 through a deionizer 62 which is utilized to provide pure makeup feed water by flowing the fresh water over deionizer beads. It is the purpose of the deionizer to cleanse the feed water of dissolved metallic ions before entering the electrolyzer. The water from the deionizer is then fed to a recirculating oxygen generating loop flowing through the anodes of the electrolyzer cells. This flow, at a rate of about 30 times the rate of water electrolysis, serves to modulate the temperature of the electrolyzer, allowing about a 50° F. temperature rise. Since the deionizer beads will not function under the high temperatures in the oxygen loop, the output of electrolyzer 60 is coupled to a heat exchanger 64 and thence to an oxygen/water separator 66 which removes the feed water and transmits it back to deionizer 62 via conduit 68.

When the electrolyzer is in operation, water is protonically pumped from the anode to the cathode of the electrolyzer at about eight times the rate electrolyzed, with the excess water used to dissipate the waste heat from the electrolyzer. The cathode effluent is hydrogen which is fed directly to a hydrogen/water separator 70, with waste water being fed back to deionizer 62 over conduit 72 as illustrated.

The oxygen output of separator 66 is coupled to vessel 36 via conduit 74 which extends upwardly in vessel 36 as illustrated at 76 above the waterline 78 in the vessel. An outlet conduit 80 is provided as illustrated above this water line. When such oxygen is devolved at the electrolyzer, water is displaced from vessel 36 via aperture 82 which originally admitted the water, the gas being pressurized at the pressure established by the ambient sea water.

Likewise, the hydrogen output from separator 70 is coupled via conduit 82 to vessel 34, with the outlet conduit 86 also extending into vessel 34. The operation of vessel 34 is identical to that of vessel 36 to provide pressurized hydrogen.

Figure 3:
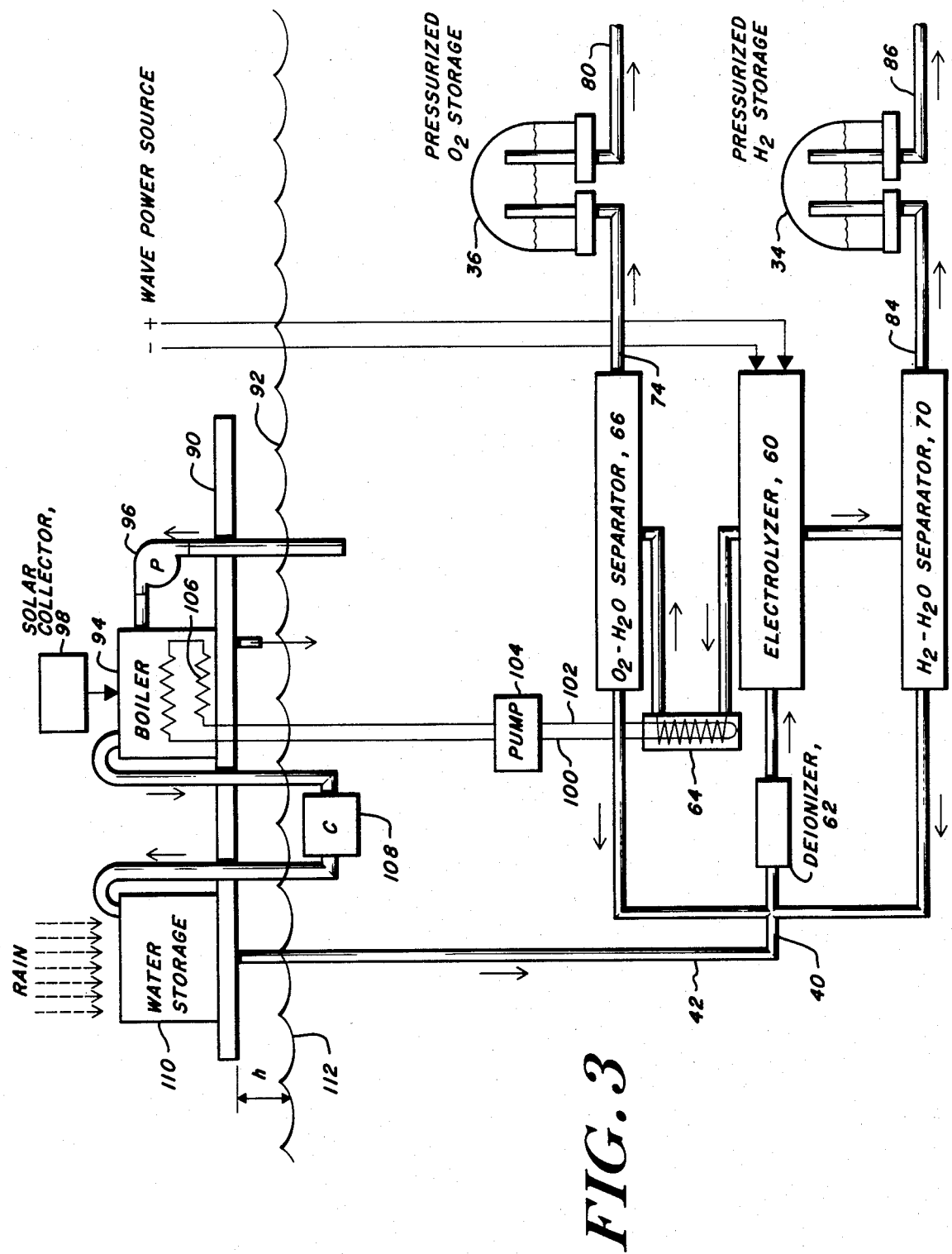
FIG. 3 is a schematic and block diagram of one system for utilizing waste heat from the electrolyzer in the production of hydrogen and oxygen.

Referring now to FIG. 3 in which like elements are provided with like reference characters vis a vis FIGS. 1 and 2, it will be appreciated that because of the waste heat, at least in the oxygen loop, this may in part be utilized at the surface of the ocean to provide for the boiling of sea water so as to provide a local source of fresh water in the form of distilled water.

As will be appreciated, the lower the pressure, the lower the boiling temperature. Sea water distillation is therefore carried out at the sea surface. A platform 90 is provided at a distance, h, above the sea surface 92 to support a boiler 94 into which sea water is pumped via a pump 96. Energy for the boiler may be supplied by solar collection means 98 and/or from waste heat from heat exchanger 64. Working fluid in lines 100 and 102 is heated at heat exchanger 64 and is pumped by pump 104 to boiler 94 through a heat exchanger 106 in the boiler. Steam from the boiler is condensed at a condensor 108, and is cooled because it is immersed in sea water, with the distilled water being supplied to a water storage unit 110 augmented by rain as illustrated. With the storage unit being located at a height h above sea surface 112, a sufficient pressure head is provided for the fresh water in standpipe 42.

In this manner waste heat is utilized in the providing of fresh water at the ocean surface. Alternatively, the waste heat can be utilized at the ocean bottom to distill sea water. It will be appreciated that the subsurface boiler may be vented to atmosphere at the sea surface so that the distillation may take place at lower temperatures.

In any event what is provided is the utilization of the waste heat from the electrolysis to provide fresh water without the necessity of the expenditure of large amounts of energy for pumping. The pumping necessary for the FIG. 3 embodiment is minimal and thus an efficient system is illustrated for the utilization of wave power in the production of hydrogen.

Wave-Powered Electric Generators

Figure 4:
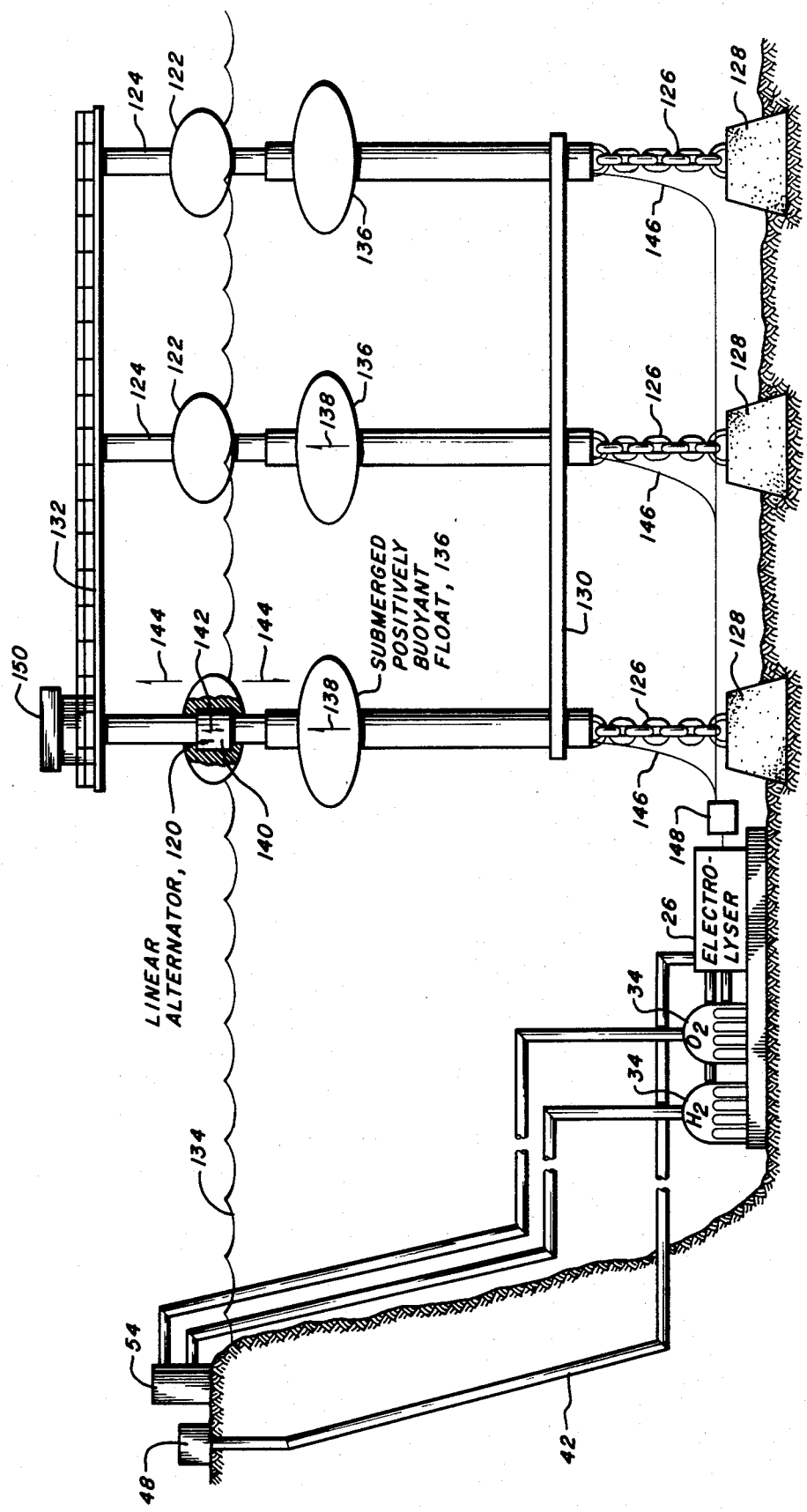
FIG. 4 is a diagrammatic illustration of the use of buoyant linear alternators for wave-powered generation of electricity for water electrolysis; and, FIG. 5 is a diagram illustrating the production of electricity by wave power utilizing a tethered buoyant helix.

As mentioned hereinbefore, it is important to be able to provide for the efficient generation of electricity through the utilization of wave motion. Referring to FIG. 4, the electrolyzer and system of FIG. 1 is depicted to the left of this figure. Power for the submerged electrolysis unit is supplied by linear alternators 120 which are captured in buoyant floats or bodies 122 which are mounted for reciprocation on upstanding columns 124. The columns are anchored at their lower ends by a flexible cable 126 such as a chain to anchoring means 128, for instance, a concrete block at the sea bottom. The columns are spaced relative to one another at their bases by struts 130 and are spaced at the top by virtue of a platform 132 which is supported by the columns above the sea surface 134. The upright position of the columns is maintained by positively buoyant submerged floats 136 which exert forces illustrated by arrows 138 in upward direction, the floats being secured to respective columns and maintained at a position beneath the sea surface by the cable between the lower end of the column and the anchoring means. The degree to which the verticality of the columns can be maintained is primarily a function of the positive buoyancy of the floats vis a vis the weight of the structure supported by the columns as well as the columns themselves. It will be appreciated that the length of the column, the position of the positively buoyant float and its buoyancy at a predetermined depth, coupled with the weight of the columns and the structure it supports, determines the degree of verticality of the entire structure. Because the columns are secured to each other top and bottom, there is an additive effect for maintaining the verticality of the columns.

Each linear alternator includes field coil windings positioned about and fixedly attached to the upstanding column. The armature of the alternator may be provided by fixed magnets secured to a housing 140 which is mounted for reciprocation on upstanding column 124 so as to move in the direction of double-ended arrow 142. It will be appreciated that linear motors have been used in the past for the generation of electrical energy through wave action as illustrated by U.S. Pat. No. 3,783,302.

In operation, since the linear alternator is captured in its respective buoyant float, as the float moves up and down with wave motion as indicated by arrows 144, a.c. power is produced which may be transmitted to the ocean bottom by lines 146 to a rectification circuit 148 for transforming the a.c. power into d.c. current usable in the electrolysis of water. Alternatively, the alternators may be provided with a diode bridge rectification circuit (not shown) so that rectification is accomplished at the alternator.

As will be appreciated, any number of structures 150 may be mounted on platform 132 such as one for housing auxiliary electronic equipment and for providing crew quarters.

What has been provided is the combination of a platform support structure and an electric power generator in which efficient power generation is accomplished through the movement of donut-shaped buoyant bodies about the upstanding columns. The number of moving parts for the conversion of wave energy into electrical energy is minimal which adds to the longevity of the system and is especially useful for offshore unattended operation.

Figure 5:
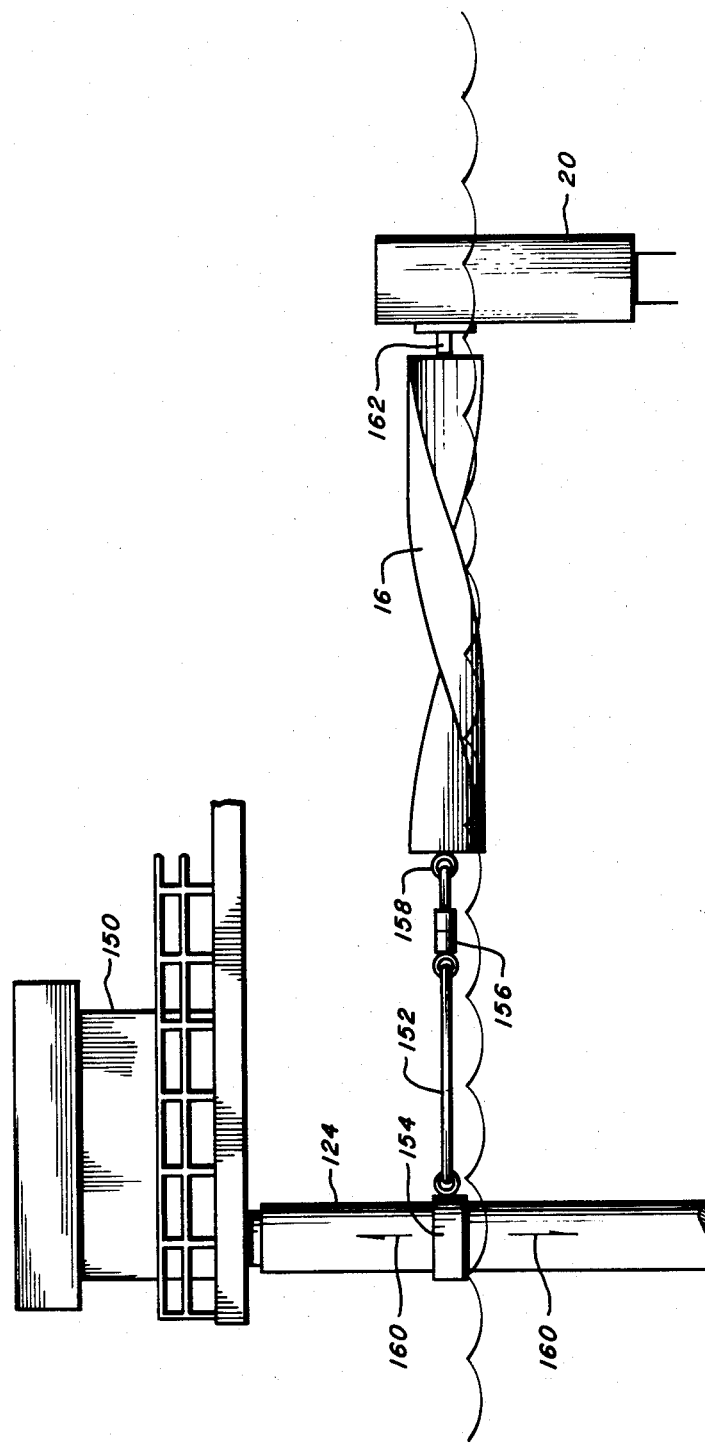

Referring now to FIG. 5, buoyant helix 16 of FIG. 1 is tethered to an upstanding column 124 of FIG. 3 through the utilization of a tether 152 strung between a collar 154 and a swivel 156 coupled to end 158 of the buoyant helix. Collar 154 is permitted to rotate about column 124 and is permitted vertical movement as illustrated by arrows 160 so as to accommodate tidal changes.

Helix 16 is configured in the manner described in the aforementioned Lapeyre patent application so as to have a period matching the period of the expected waves. Moreover, buoyant electric generator 20 is coupled by shaft 162 to the centerline of the helix, with the generator being weighted so as to maintain an upright position as shown.

In operation, the helix/generator combination is free to swing in any direction so as to oppose the direction of wave motion. In this manner the helix turns only in one direction and there is no need for the utilization of rectifiers for the output of generator 20.

In summary, an ocean-moored water electrolysis plant produces high pressure gas by electrolysis of fresh water through the utilization of wave-powered electrical generating apparatus. The plant includes the combination of a wave-powered electric generator at the ocean surface, an electrolyzer and storage vessels located at the ocean bottom for providing gas under pressure, and a source of fresh water at the ocean surface forced down to the submerged electrolyzer through the use of a water-filled standpipe. Electric power for the subsurface electrolyzer, in one embodiment, includes the utilization of a tethered floating helix coupled to an electric generator in which the helix is automatically aligned with the wave propagation direction. In another embodiment, linear alternators are mounted for reciprocation on an upstanding column which extends through the air-sea interface, with each alternator being provided with a donut-shaped float, such that electric power is generated as each float moves vertically up and down responsive to wave motion.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for the offshore generating of pressurized gas from wave power comprising:
   a fresh water subsea electrolyzer;
   wave-powered means for directly providing electric power to said subsea electrolyzer and not to any fresh water pumping system, such that maximum use is made of the wave power to electric power conversion;
   a source of fresh water sufficiently above the sea surface to provide the required pressure at the subsea electrolyzer for proper operation thereof, said source being coupled to said subsea electrolyzer;
   a subsea storage vessel having a bottom aperture adapted to admit sea water;
   an inlet conduit from said electrolyzer to the interior of said vessel;
   an outlet conduit from said vessel to an onshore location, said outlet conduit having an end positioned in said vessel, whereby pure gas under the pressure determined by the depth of said storage vessel is delivered onshore; and
   a water-filled standpipe between said source of fresh water and said subsea electrolyzer, said fresh water source including a reservoir of fresh water at a height above the sea surface sufficient to drive the fresh water to said subsea elecrolyzer without pumping such that no pump is used in the fresh water supply for said subsea electrolyzer.

2. The system of claim 1 wherein said reservoir is adapted to receive rain water.

3. The system of claim 1 wherein said wave-powered means includes an upstanding column having a positively buoyant body secured thereto; means for maintaining the buoyant body beneath the sea surface; and electric power generating means secured to said column.

4. The system of claim 3 wherein said electric power generating means includes a linear alternator having field coils fixedly attached to said column, and permanent magnets surrounding said field coils and mounted for coaxial movement about said field coils along the longitudinal axis of said column, and a buoyant float surrounding said permanent magnets, said permanent magnets being captured in said buoyant float, whereby electricity is generated when wave motion causes the buoyant float to move vertically up and down.

5. The system of claim 3 wherein said electric power generating means includes a floating helix, swivel means for tethering one end of said helix to said column, and floating electrical generating means maintained in an upright position and having a horizontal generator shaft coupled to the other end of said helix.

6. The system of claim 5 wherein said generating means is weighted so as to produce a righting moment.

7. The system of claim 6 wherein said tethered floating helix includes a tether, a ring positioned about said column and coupled to one end of said tether, and a swivel connected between the other end of said tether and one end of said floating helix.

* * * * *